Patented Jan. 26, 1954

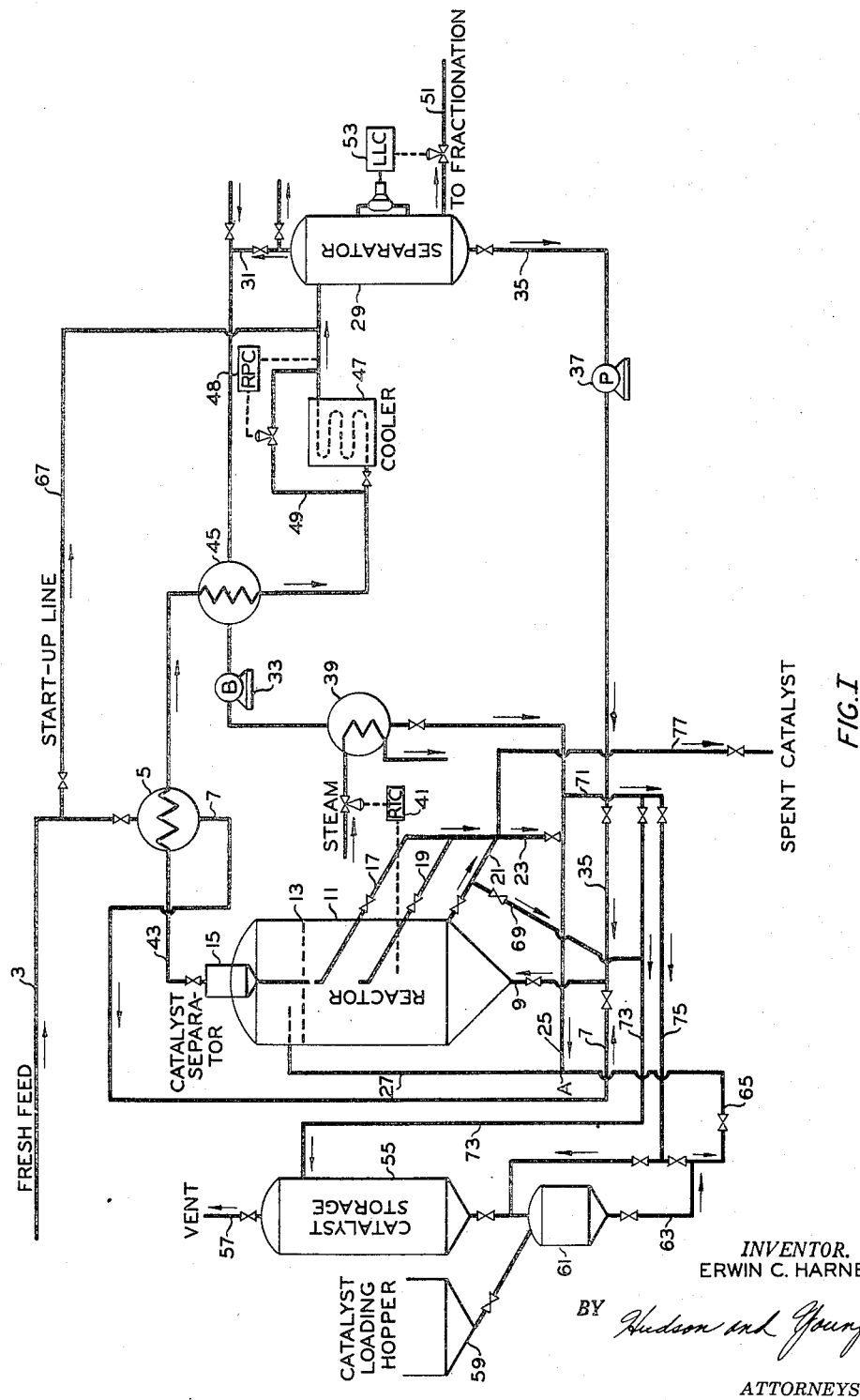
FIG. I
INVENTOR.
ERWIN C. HARNEY
BY Hudson and Young
ATTORNEYS

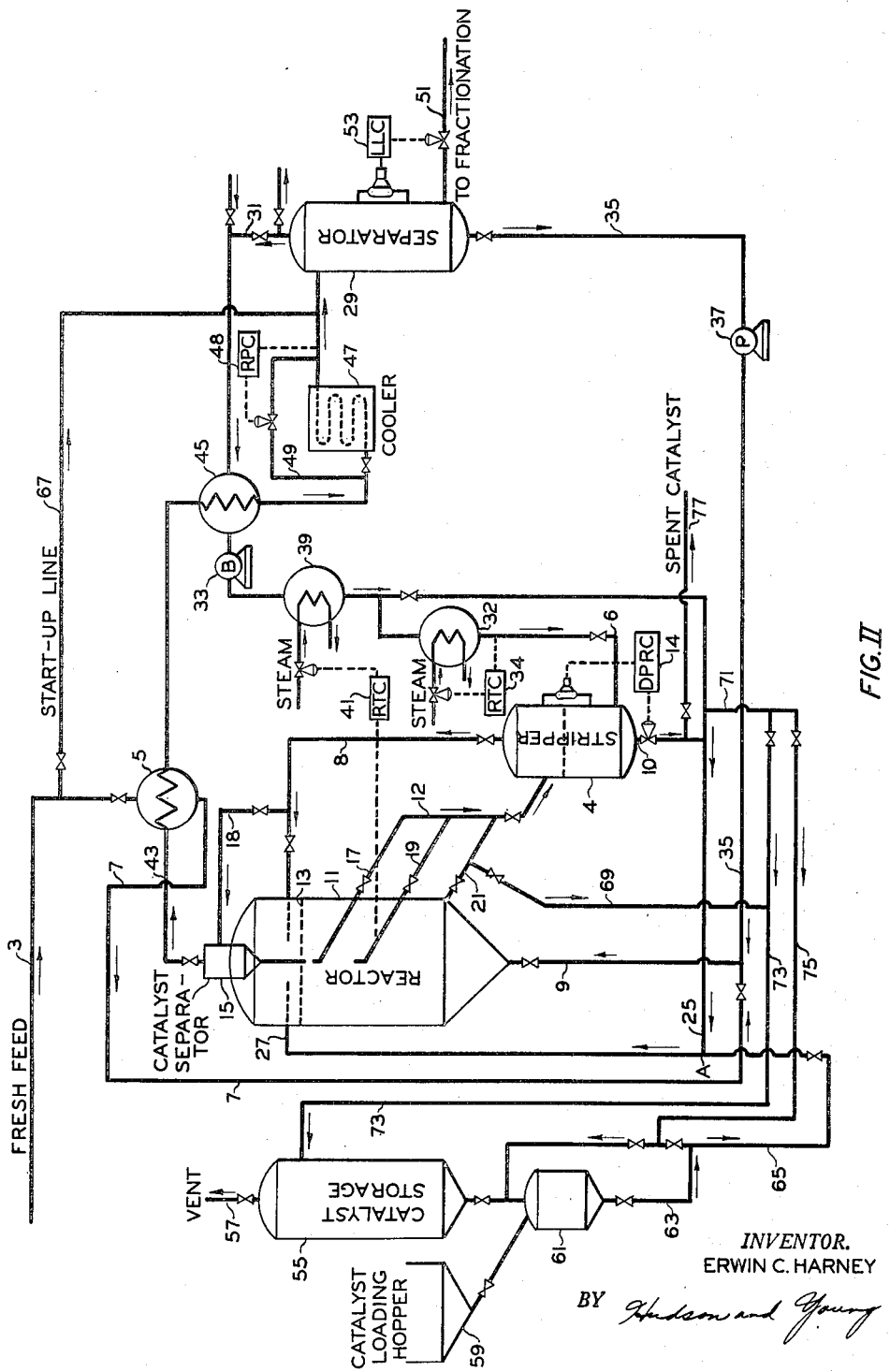

2,667,521

UNITED STATES PATENT OFFICE 2,667,521

HYDROCARBON CONVERSION PROCESS

Ervin C. Harney, Los Angeles, Calif., assignor to Phillips Petroleum Company, a corporation of Delaware Application November 4, 1948, Serial No. 58,334

5 Claims. (Cl. 260—683.15)

This invention relates to conversion of hydrocarbons. In one of its more specific aspects it relates to the polymerization of unsaturated hydrocarbons. In another of its more specific aspects it relates to the catalytic conversion of low-boiling hydrocarbons to higher-boiling hydrocarbons. In still another of its more specific aspects it relates to a process wherein low-boiling mono-olefins are polymerized by using a fluidized catalyst bed.

The conversion of low-boiling hydrocarbons, to produce higher-boiling hydrocarbons having high octane numbers, both by polymerization and by alkylation, is presently often carried out in either a chamber or tubular type reactor utilizing a fixed bed of solid catalyst. While this process has been successful commercially, it has certain inherent and operating disadvantages. Fixed bed conversion processes have the following disadvantages.

An even temperature cannot be maintained throughout the bed of polymerization catalyst.

Due to poor heat removal and resulting unfavorable temperature gradient a highly concentrated olefin stream cannot be charged to the unit.

Over polymerization is prevalent because the reaction products are not removed from the polymerizer as they are formed. This lowers the quality and quantity of the polymer formed.

Relatively short catalyst life and a continuously decreasing activity results from the reaction products and over polymerized materials not being stripped from the catalyst. These materials tend to foul and/or poison the polymerization catalyst.

Relatively low conversions of mono-olefins are obtained since the reaction products remain in the reaction or polymerization zone acting as a diluent and preventing the equilibrium reaction from proceeding in the desired direction and at the desired rate.

Usually a large amount of unreacted hydrocarbons, including inert paraffins, are recycled to the polymerization zone, so that the fractionation section following the reactors or polymerization zones is relatively over-burdened. In the usual operating system, utilizing a light olefin feed (35–45 liquid volume per cent $C_3$ and $C_4$ olefins), the fractionation section to handle the polymerization effluent is approximately twice the size of a system with no recycle. To maintain the proper contact time, space rates and velocity, the recycle for a usual olefin feed makes it necessary to double the size or the number of polymerization reactors required. An average size unit requires multiple polymerization reactors and an elaborate manifolding and control system. This increases the initial cost and operating expense.

I have now invented a conversion process which is carried out by passing olefins into contact with, and/or through, a fluidized bed of a solid olefin conversion catalyst. The fluidized catalyst is continually withdrawn from the reactor, cooled and/or stripped of high-boiling product, and passed back into the reactors. In carrying on conversion by my method I find that many of the disadvantages of ordinary fixed bed processes are not encountered. The process of my invention has the following advantages which make it far superior to the usual fixed bed type of operation.

An even temperature can be maintained throughout the fluidized bed of catalyst and/or the reaction zone.

Any concentration of olefin feed can be charged to the polymerization zone as heat removal is easily maintained.

Over polymerization of the olefins, in a polymerization conversion, is alleviated and a higher grade polymer product is formed.

Catalyst life is increased and a constant activity is maintained. Fouling and/or poisoning of the catalyst are at a minimum. Higher conversion of olefin to product can be attained.

Due to a decrease in the amount of recycled hydrocarbons, fractionation equipment size and operating expense is reduced approximately 50 per cent. It has been found that to handle the same amount of olefin feed, one polymerization reactor about the same diameter and about twice as high as the ordinary fixed bed reactor can be used in place of approximately 5 fixed bed reactors, thus decreasing the original construction cost, capital outlay and operating expense. The elaborate manifolding necessary to operate the usual fixed bed type of polymerization reactor is eliminated, and the control system is simplified, thereby reducing operating difficulties.

Many other advantages of my invention will become apparent, to one skilled in the art, from this disclosure.

It is an object of this invention to provide a method to convert unsaturated hydrocarbons.

Another object of this invention is to provide an improved method for the polymerization of low-boiling unsaturated hydrocarbons.

Another object of this invention is to provide an improved method for the conversion of low-boiling hydrocarbons by passing through a fluidized bed of a solid hydrocarbon conversion catalyst.

Still another object of this invention is to provide a method for the polymerization of low-boiling olefins so as to obtain an even temperature throughout the polymerization zone.

Still another object of this invention is to provide a method for the polymerization of low-boiling mono-olefins so that heat of reaction can be easily removed from the polymerization reactor so as to make it possible to feed any concentration of olefin feed desired.

Still another object of this invention is to provide a method for the polymerization of low-boiling mono-olefins wherein over-polymerization is alleviated and a higher grade product is formed.

Still another object of this invention is to provide a method for the catalytic polymerization of low-boiling mono-olefins wherein catalyst life is increased, a constant activity is maintained and fouling and/or poisoning of the catalyst is at a minimum.

Still another object of this invention is to provide a method for the catalytic polymerization of olefins wherein less equipment, less capital outlay and a less elaborate control system is necessary than in the ordinary fixed bed type of polymerization reaction.

Many other objects of my invention will become apparent, to one skilled in the art, from this disclosure.

I have invented a conversion process which operates with a fluidized bed of catalyst and utilizes circulation of catalyst to control reaction variables particularly temperature within the fluidized bed where the reaction occurs. My process can be utilized for olefin polymerization, or for reaction of olefins with paraffins or aromatics by alkylation. In a preferred embodiment, my process is used to polymerize olefins, particularly low-boiling olefins like propylene, butylenes, amylenes, or mixtures thereof. In the usual refinery operation monoolefins to be polymerized are available in admixture with low-boiling paraffinic hydrocarbons, such as $C_2$ to $C_5$ paraffins, or in some cases additional minor quantities of $C_1$ and/or $C_6$ paraffins. At times, small amounts of diolefins and/or acetylenes will also be present.

The process of my invention is particularly adaptable to handle such refinery mixed feed streams, and a small proportion of accompanying light unreacted paraffinic hydrocarbons is used to pass circulating catalyst back to the polymerization zone without making it necessary to provide extraneous paraffins to use in circulating the catalyst. The polymerization process of my invention can be operated successfully with any concentration of olefin in the feed, and particularly well with a feed containing from 35 to 45 liquid volume per cent $C_3$, $C_4$ and $C_5$ mono-olefins and from 55 to 65 per cent $C_2$ to $C_5$ paraffins.

My process will work with any solid mono-olefin polymerization catalyst which can be fluidized, but I prefer to use a silica-alumina catalyst, such as disclosed in Hendrix and Chapman, 2,342,196, copper pyrophosphate, a "solid" phosphoric acid catalyst which results when bauxite, fuller's earth, silica gel, kieselguhr, or the like, is impregnated with a phosphoric acid. Similar fluidized solid catalysts can also be used for previously mentioned alkylation reactions, when suitable conditions of temperature, pressure and low-olefin concentration are used, as discussed in Frey et al. 2,445,824.

Figure I which accompanies and is a part of this disclosure is a diagrammatic flow sheet showing a preferred specific embodiment of my invention.

Figure II which accompanies and is a part of this disclosure is a diagrammatic flow sheet showing another preferred specific embodiment of my invention, in which an external stripper is used to strip reaction products from the polymerization catalyst.

In order to more clearly set forth the process of my invention, I will in the following discuss a preferred embodiment of my invention. As will become apparent to one skilled in the art, changes in piping, control, method, apparatus, and the like can be made in practicing my invention and adapting it to any specific set of circumstances without deviating from the scope of my invention. Therefore, the following discussion is not to be deemed to unduly limit the scope of my invention.

Referring now to Figure I, an olefin-bearing charge, containing low-boiling mono-olefins such as $C_3$, $C_4$ and $C_5$ mono-olefins in admixture with low-boiling paraffins such as $C_2$ to $C_5$ paraffins, is passed through line 3 to a heat exchange zone 5 wherein the feed stock is heated to a temperature of from 225 to 500° F., preferably 300 to 325° F., by interchange with the reactor effluent. This feed preheat step is, of course, optional, depending on the temperature at which the feed is available, but offers a particularly good heat saving step if the feed needs heating. The gaseous heated feed stream is passed through lines 7 and 9 into the lower portion of a polymerization zone, represented by reactor 11, which is operated at a temperature of 275 to 550° F., preferably 350 to 400° F. and at a pressure of 120–1200, preferably 550 to 670, pounds per square inch gauge. Polymerization zone 11 contains a fluidized bed of a solid olefin polymerization catalyst, having a particle size of 20 microns diameter to 10 mesh, preferably 50 to 125 microns diameter. The feed gases pass upward through the fluidized bed of countercurrently moving catalyst at a linear velocity of 0.1 to 5, preferably 0.3 to 1, foot per second and the polymerization reactions proceed. A fluidized bed of the proper density is maintained by correlating the weight and size of the catalyst particles with the velocity and density of the upwardly moving gases, a relatively large particle catalyst usually requiring a greater gas velocity than a relatively small particle catalyst. The gases pass upwardly through the polymerization zone at a net upward velocity greater than the net downward velocity of the solid polymerization catalyst. The temperature in the polymerization zone is maintained by withdrawing, cooling and recycling the catalyst as will hereinafter be set forth. A sufficient pressure is maintained in the polymerization zone to cause partial condensation of the reaction products on the catalyst in the upper portion of the catalyst bed. In Figure I, line 13 represents the upper limit of the fluidized bed. A space containing a small concentration of catalyst is maintained in the upper part of polymerization zone 11 above the fluidized bed, shown diagrammatically in sections. In operation there is a sharp distinction between the fluidized bed and this upper zone. The fluidized bed is a relatively dense phase resembling a heavy boiling liquid while the vapor phase above the fluidized bed resembles smoke. Polymerization reactor 11 is preferably equipped with a catalyst separator device 15 which may conventionally take the form of a cyclone separator, Cottrell precipitator, supersonic precipitator, or the like. In Figure I, catalyst separator means 15 is diagrammatically drawn to represent a cyclone separator with a depending leg which extends down into and below the surface of the fluidized bed so that the particles separated from the gas in the separator are passed into the dense phase.

In order to maintain high conversion and reduce overpolymerization, it is desirable to remove the polymerization products from the reaction zone as they are produced. In my process pressure in the reactor is maintained at a sufficiently high level to cause partial condensation of these reaction products in the upper portion of the catalyst bed. A substantial portion of partially condensed reaction products will then accumulate on and be removed with catalyst from the upper portion of the fluidized bed and stripped of any condensed polymers as hereinafter explained. By removing the reaction products with the circulating catalyst, overpolymerization is reduced, and at the same time, the conversion of olefins is increased due to the shifting of the equilibrium of the reaction. My process is an improvement over a conventional fixed bed or tubular reaction process because a highly olefinic feed may be utilized without the use of a recycle stream to reduce the olefin concentration of the reactor feed. Catalyst and accompanying polymer is withdrawn from the fluidized bed contained in polymerization reactor 11 through withdrawal lines represented by lines 17, 19 and 21. The withdrawal lines are so located that the catalyst may be withdrawn from the upper, intermediate and/or lower portions of the fluidized bed according to what is necessary to maintain the desired temperature throughout the fluidized bed. I find it preferable to withdraw, 35–45 per cent of the total amount of catalyst circulated from the upper portion of the fluidized bed, 35–45 per cent of the total amount of catalyst circulated from the intermediate portion of the fluidized bed and 10 to 30 per cent of the total amount of catalyst circulated from the lower portion of the fluidized bed. Withdrawal line 17 is preferably located in the upper portion of the fluidized bed and below the depending leg from the cyclone separator if such means is used as the catalyst separator. Withdrawal line 19 is preferably located in the intermediate portion of the fluidized bed, and withdrawal line 21 is preferably located in the lower portion of the fluidized bed. Multiple withdrawal lines are provided so that the polymerization reactor temperature can be controlled most adequately. Depending on the size of the reactor, three catalyst withdrawal points are usually adequate. I prefer to withdraw catalyst to a standpipe, represented by line 23, where it is allowed to settle, thus increasing its density and maintaining a "self-stripping" action on any entrained gases. Catalyst is then transported back through lines 25 and 27 to the reactor dilute phase above the fluidized bed with a portion of the light unreacted mostly paraffinic hydrocarbons from an overhead accumulator represented by separator 29. I prefer to pass the catalyst in admixture with light hydrocarbons back to the reactor tangentially to and at a point just above the level of the dense phase fluidized bed.

The light gases used to pass the catalyst back to the polymerization zone are flashed from the reactor overhead accumulator 29 and are passed through line 31 in which is located blower 33 which compresses the gases sufficiently to allow their return to the reactor with the catalyst. The quantity of light, lean gas used to transport the catalyst is sufficient to raise the mixture well above its dew point and strip or flash the reaction products from the catalyst and, at the same time, cool the catalyst sufficiently to allow its return to the polymerization zone.

The unreacted gases and uncondensed polymerization products from the dense phase catalyst bed mix with the gases from the circulating catalyst return, and proceed upward through the dilute catalyst phase. This disengaging space (a dilute phase) allows substantially all the entrained catalyst to settle and return to the dense catalyst phase. The remaining portion of the entrained catalyst is separated from the gases in a catalyst separator as hereinbefore described and is returned through a depending dip pipe to the reactor dense phase. The degree of fluidization in the dense phase reactor zone is kept low and the catalyst carry-over is usually negligible. However, any catalyst that may be carried over is returned to the reactor in the form of a concentrated slurry through line 35 in which is located slurry pump 37.

The reactor temperature is preferably maintained constant by controlling the steam to a heater 39 located in lean gas circulating line 31. I prefer to use a recording temperature controller 41 with the control point located in the fluidized bed to regulate the steam to heater 39. The heat content of the lean circulating gas is usually sufficiently low to cool the circulating catalyst more than is desired. So, a heating means 39 is usually desirable. As the lean gases cool the catalyst by direct exchange, this affords an easy and preferred means of controlling the reactor temperature.

The products of the polymerization reaction in admixture with the unreacted light paraffinic hydrocarbons are withdrawn overhead from polymerization zone 11 through line 43 and passed to a heating zone represented by heat exchanger 5 wherein the fresh feed is heated as hereinafter set forth. If fresh feed is available at the proper temperature this heat exchange is unnecessary. The partially cooled overhead gases from heat exchanger 5 are passed to a heat exchange zone represented by heat exchanger 45 in line 43 where they are used to heat the lean gases in line 31. Heat exchanger 47 in line 43 is provided to further cool and partially condense the overhead gases which are ultimately passed to an overhead accumulator represented by separator 29 which is preferably operated at a pressure of from 540 to 660 pounds per square inch gauge and at a preferred temperature of from 200 to 300° F. The pressure on polymerization reactor 11 is preferably controlled by a recording pressure controller 48 in by-pass line 49 around heat exchanger 47 with the pressure control point in line 43. Polymerization product is withdrawn from separator 29 through line 51. The amount of product withdrawn from the system is preferably controlled by liquid level controller 53 on separator 29.

A catalyst storage tank 55 vented by line 57 is provided to receive catalyst when the polymerization reactor is evacuated. Catalyst storage tank 55 may also be employed to hold the catalyst for charging. Diagrammatic flow sheet, Figure I, shows a convenient catalyst system for charging and/or evacuating the polymerization reactor. Catalyst enters the charging system through catalyst loading hopper 59 into a charging drum 61. To charge the reactor catalyst is withdrawn from loading drum 61 and is passed through lines 63 and 65 to point A where it is picked up with gas from line 25 and passed through line 27 into the polymerization reactor. A start up line 67 is preferably used when starting up the system to provide vapors used in charging the polymerization reactor. To empty the polymerization reactor 11 catalyst is withdrawn through line 69 and picked up with vapor from line 71 and passed through line 73 to catalyst storage 55. Catalyst charging drum 61 may be pressurized with recycle and charging gas passed through line 75 into charging drum 61. Since in the course of operation some of the catalyst becomes fouled and/or poisoned, a line 77 is provided so that this foul and/or poisoned catalyst may be withdrawn from the system to be regenerated or thrown away as desired. I find this method of charging and evacuating the polymerization reactor to be efficient and convenient.

Should the retentive adsorptive capacity of the catalyst for the reaction products, after stripping and flashing as previously described, be sufficiently high to cause overpolymerization, an external stripper can be installed in the catalyst circuit. This method of operation is shown in diagrammatic flow sheet Figure II, much of the same equipment is shown, and identified with the same numerals, as has been shown in Figure I. In this scheme the catalyst is withdrawn from the reactor 11 as previously described and is preferably fed to approximately the center of a down flow stripper 4 equipped with either cross flow baffles, a series of distributing grids, or the like, not shown. In the stripper the catalyst is countercurrently contacted with a heated stream of unreacted, mostly paraffinic, gases flashed from the reactor overhead accumulator, or separator, 29. The quantity and temperature of the stripper gas passed to stripper 4 through lines 31 and 6 is maintained sufficiently high to lower the retentive adsorptive capacity of the catalyst for the adsorbed products and thereby allow the desorbed products to be removed overhead from the stripper in admixture with stripper gas. The temperature of the stripper gas may conveniently be controlled by steam heater 32 in line 6. Steam to heater 32 is preferably controlled by recording temperature controller 34 with the control point located in line 6. The stripper overhead can be returned either through line 8 to the reactor dilute phase or it may be returned to the reactor catalyst separator 15 through line 18. If desired, steam may be used or a combination of steam and hydrocarbons from separator 29 may be used to strip the catalyst in stripper 4. If steam is used means for separating condensed water vapors from the reactor overhead hydrocarbon stream is used. This means may conveniently be a decanter (not shown) in line 43 after condenser 47.

In using an external stripper such as shown in Figure II, it may be desirable at times to strip under reduced pressure in order to get more effective stripping of the adsorbed product from the catalyst. In doing so, the stripper overhead could not be returned to the polymerization reactor without repressuring but would have to go to an overhead fractionation system (not shown). If stripping under reduced pressure a dust pump or other suitable means (not shown) would also be needed to return the stripped catalyst to the reactor.

In operating with an external stripper the stripped catalyst is removed from the bottom of the stripper through line 10 and returned to the reactor dilute phase with a portion of the light unreacted mostly paraffinic gases from the reactor overhead accumulator 29. As previously described, a sufficient quantity of gas is used to cool the catalyst for its return to the reaction zone. The gas used for cooling and transporting the catalyst, plus the stripper overhead gases, plus the unreacted gases from the dense phase catalyst bed and the uncondensed reaction products mix and pass upward through the catalyst separator 15 as previously described.

As is seen by examining diagrammatic flow sheets Figures I and II, instrumentation and control are essentially the same while operating with an external stripper as in the previously described system without an external stripper. Catalyst circulation can be set by a manually operated gate valve at the base of a standpipe represented by line 12, Figure II, and by line 23, Figure I. In flow scheme Figure II the stripper level is held constant with a differential presure level controller 14 operating a slide valve or like means in a stripped catalyst standpipe represented by line 10. The temperature and quantity of the stripper gas and also the catalyst circulating gas is preferably controlled with the usual type of temperature and flow controllers as shown. A temperature control point located in the fluidized bed sets the catalyst circulating gas temperature controller. In this preferred system of controls the catalyst circulation is maintained constant and the reactor temperature held constant by varying the temperature of the returned catalyst; however, catalyst circulation can be automatically varied to control reactor temperature. To do this requires replacing the manually operated gate valve at the bottom of the standpipes 23 and 12 with a slide valve or like means. The automatic slide valve is positioned by a differential pressure controller reset by the reactor bed temperature controller. This means of operating is not shown on the flow diagrams. In operating with an external stripper I find that it is best to maintain the reaction temperature by varying the temperature of the recycle catalyst rather than by varying the amount of recycled catalyst since varying the amount of recycled catalyst has the disadvantage of varying the amount of catalyst to be stripped.

With low olefin concentration in the feed a reactor pressure high enough to obtain partial condensation of the reaction products on the catalyst in the upper portion of the fluidized bed is difficult to maintain, but I find that it is not imperative to attain partial condensation. By failing to partially condense and withdraw the reaction products as they are formed, slightly lower conversions are obtained; however, the system will operate efficiently and give close temperature control even though partial condensation is not obtained.

In operating my process withdrawal of catalyst from the lower portion of the fluidized bed is sometimes unnecessary; however, in normal operation some of the hottest catalyst from the upper portions of the fluidized bed will gradually build up in the lower portion of the bed necessitating continual withdrawal of some of the catalyst at this point to give effective heat control. I find that the quantity of catalyst withdrawn from the lower portion of the bed is usually less than the amount of catalyst withdrawn from the intermediate and upper portions of the fluidized bed.

*Example*

The temperatures, pressures, hydrocarbon stream compositions, quantities, equipment etc. referred to in the following example are only illustrative of my invention and are not to be deemed to unduly narrow the scope of my invention. So as to more clearly illustrate my example reference is made to the accompanying diagrammatic flow sheet, Figure I. Fresh feed at the temperature of 100° F. and under a pressure of 640 pounds per square inch gauge is passed via line 3 at a rate of 6200 B./D. to a heat exchange zone represented by heat exchanger 5 wherein it is heated to a temperature of 300° F. The composition of the fresh feed is as follows:

| Composition | B./D. | LV, percent |
|---|---|---|
| $C_2$ | 325 | 5.2 |
| $C_3$ | 1,160 | 18.7 |
| $C_3=$ | 990 | 16.0 |
| $iC_4$ | 1,030 | 16.6 |
| $nC_4$ | 1,160 | 18.7 |
| $C_4=$ | 1,405 | 22.7 |
| $C_5$ | 130 | 2.1 |
| Total | 6,200 | 100.0 |

The heated feed stream is then passed via lines 7 and 9 into a polymerization zone represented by reactor 11 which operates at a temperature of 350° F. and under a pressure of 610 pounds per square inch gauge. The polymerization reactor which is 5 feet in diameter contains a fluidized bed of 75 to 125 micron diameter silica-alumina polymerization catalyst 65 feet in depth, the fluidized bed being in the nature of a heavy boiling liquid. In operation there is a 15 ft. light phase resembling smoke in the top of the polymerization reactor and above the fluidized bed.

Catalyst withdrawal lines 17, 19 and 21 are provided to withdraw catalyst from the upper, intermediate and lower portions of the fluidized bed respectively. The catalyst is withdrawn through 6" internal diameter lines 17, 19 and 21 to a 12" internal diameter standpipe 23. A gate valve in line 17 is adjusted so that one ton per minute of catalyst is withdrawn from the upper portion of the fluidized bed. The gate valve in line 19 is adjusted so that one ton per minute of catalyst is withdrawn from the intermediate portion of the fluidized bed. A gate valve in line 21 is adjusted so that half a ton per minute of catalyst is withdrawn from the lower portion of the fluidized bed. All of the catalyst withdrawn from the fluidized bed collects in standpipe 23 and a gate valve in the bottom of standpipe 23 is adjusted so that the catalyst is withdrawn from the standpipe and passed back through lines 25 and 27 into reactor 11, at a point just above the level of the fluidized bed. Unreacted paraffin hydrocarbons are withdrawn from separator 29 at a rate of 1800 mcfd. and used to pass the catalyst back into reactor 11. Before the vapors from separator 29 pick up the circulating catalyst they are passed through heat exchangers 45 and 39. The 2½ tons of catalyst continuously withdrawn from reactor 11 is picked up continuously by the vapors withdrawn from the separator and the mixture is passed back into reactor 11 at a temperature of 300° F.

The unreacted gases and uncondensed polymerization products from the dense phase catalyst bed mix with the gases from the circulating catalyst return and proceed upward through the dilute catalyst phase. These gases are passed through a cycle separator represented by catalyst separator 15 in the top of polymerization reactor 11 and the entrained catalyst is separated from the gases and returned to the dense phase catalyst bed. The mixed gases withdrawn overhead have a temperature of 300° F. and are passed through heat exchanger 5 where they preheat the feed, through heat exchanger 45 where they preheat the vapors withdrawn from separator 29 to circulate catalyst, through overhead condenser 47, and into separator 29. Catalyst separator 29 is operated at a temperature of 250° F. and under a pressure of 600 pounds per square inch gauge. A liquid hydrocarbon stream is withdrawn at a rate of 4714 B./D. from separator 29 through line 51 as product of the process. This withdrawn product stream has the following composition:

| Composition | B./D. | LV, percent |
|---|---|---|
| $C_2$ | 325 | 5.8 |
| $C_3$ | 1,160 | 20.3 |
| $C_3=$ | 150 | 2.6 |
| $iC_4$ | 1,030 | 18.0 |
| $nC_4$ | 1,160 | 20.3 |
| $C_4=$ | 110 | 1.9 |
| $C_5$ | 130 | 2.3 |
| $C_6+$ | 1,649 | 28.8 |
| Total | 5,714 | 100.0 |

As will be evident to those skilled in the art, various modifications of this invention can be made, or followed, in the light of the foregoing disclosure and discussion, without departing from the spirit or scope of the disclosure or from the scope of the claims.

I claim:

1. An improved process for catalytically polymerizing hydrocarbons, which comprises: passing a hydrocarbon stream, containing low-boiling mono-olefins in admixture with low-boiling paraffins into the bottom portion of a polymerization zone operating at a temperature of from 275 to 550° F. and at a pressure of from 120 to 1200 pounds per square inch gauge and containing a fluidized bed of a 20 microns diameter to 10 mesh silica-alumina polymerization catalyst, said fluidized polymerization catalyst slowly moving downward countercurrent to said hydrocarbon stream which flows upward at a rate of 0.1 to 5 feet per second; maintaining a gaseous hydrocarbon phase in the upper portion of said polymerization zone and above said fluidized bed; causing said mono-olefins to polymerize in said polymerization zone and causing resulting polymerization products to partially condense on said silica-alumina catalyst in the upper portion of said fluidized bed; withdrawing a resulting polymerization product in admixture with unpolymerized hydrocarbons overhead from said polymerization zone and passing same to a separation zone; withdrawing a hydrocarbon stream comprising unreacted paraffins from said separation zone; withdrawing from said polymerization zone a portion of said silica-alumina catalyst present in said fluidized bed and combining same with said hydrocarbon stream withdrawn from said separation zone;

passing a resulting mixture of withdrawn catalyst and hydrocarbon stream back into said polymerization zone at a point above said fluidized bed, said catalyst being returned to said fluidized bed at a temperature lower than said temperature of polymerization and withdrawing a hydrocarbon stream from said separation zone containing polymerization products of said process.

2. An improved process for catalytically polymerizing hydrocarbons, which comprises: passing a hydrocarbon stream, containing low-boiling mono-olefins in admixture with low-boiling paraffins into the bottom portion of a polymerization zone operating at a temperature of from 275 to 550° F. and at a pressure of from 120 to 1200 pounds per square inch gauge and containing a fluidized bed of a 20 microns diameter to 10 mesh silica-alumina polymerization catalyst, said fluidized polymerization catalyst slowly moving downward countercurrent to said hydrocarbon stream which flows upward at a rate of 0.1 to 5 feet per second; maintaining a gaseous hydrocarbon phase in the upper portion of said polymerization zone and above said fluidized bed; causing said mono-olefins to polymerize in said polymerization zone and causing resulting polymerization products to partially condense on said silica-alumina catalyst in the upper portion of said fluidized bed; withdrawing a resulting polymerization product in admixture with unpolymerized hydrocarbons overhead from said polymerization zone and passing same to a separation zone; withdrawing a hydrocarbon stream comprising unreacted paraffins from said separation zone; withdrawing from said polymerization zone a portion of said silica-alumina catalyst present in said fluidized bed and combining same with said hydrocarbon stream withdrawn from said separation zone; passing a resulting mixture of withdrawn catalyst and hydrocarbon stream back into said polymerization zone at a point above said fluidized bed, said catalyst being returned to said fluidized bed at a temperature lower than said temperature of polymerization maintaining said polymerization zone temperature constant by controlling heat content of said hydrocarbon stream withdrawn from said separation zone in relation to temperature in said fluidized bed; and withdrawing a hydrocarbon stream from said separation zone containing polymerization products of said process.

3. An improved process for catalytically polymerizing hydrocarbons, which comprises: passing a stream of hydrocarbons, containing low-boiling mono-olefins in admixture with low-boiling paraffins, into the bottom portion of a polymerization zone operating at a temperature of from 350 to 400° F. and at a pressure of from 550 to 670 pounds per square inch gauge and containing a fluidized bed of 50 to 125 micron diameter silica-alumina polymerization catalyst, said fluidized polymerization catalyst slowly moving downward countercurrent to said hydrocarbon stream which slowly flows upward at a rate of 0.3 to 1 foot per second; maintaining a gaseous hydrocarbon phase in the upper portion of said polymerization zone and above said fluidized bed; causing said mono-olefins to polymerize in said polymerization zone and causing resulting polymerization products to partially condense on said catalyst in the upper portion of said fluidized bed; withdrawing a resulting polymerization product in admixture with unpolymerized hydrocarbons overhead from said polymerization zone; passing said overhead product in admixture with unpolymerized hydrocarbons to a separation zone; withdrawing a hydrocarbon stream comprising unreacted paraffin hydrocarbons from said separation zone and using same as hereinafter set forth; withdrawing from said polymerization zone a portion of said silica-alumina catalyst present in the upper portion of said fluidized bed in such quantity that said upper bed catalyst withdrawn amounts to from 35 to 45 per cent of the total amount of silica-alumina catalyst withdrawn from said polymerization zone; withdrawing from said polymerization zone a portion of said silica-alumina catalyst present in the intermediate portion of said fluidized bed in such quantity that said intermediate bed catalyst withdrawn amounts to 35 to 45 per cent of the total amount of silica-alumina catalyst withdrawn from said polymerization zone; withdrawing from said polymerization zone a portion of said silica-alumina catalyst present in the lower portion of said fluidized bed in such quantity that said lower bed catalyst withdrawn amounts to from 10 to 30 per cent of the total amount of silica-alumina catalyst withdrawn from said polymerization zone; passing said catalyst withdrawn from the upper, intermediate and lower portions of said fluidized bed in admixture with said hydrocarbon stream withdrawn from said separation zone as hereinbefore set forth back into said polymerization zone at a point above said fluidized bed, said catalyst being returned to said fluidized bed at a temperature lower than said temperature of polymerization and withdrawing a hydrocarbon stream from said separation zone containing polymerization products of said process.

4. An improved process for catalytically polymerizing hydrocarbons which comprises: passing a gaseous feed stream of hydrocarbons, containing $C_3$, $C_4$ and $C_5$ mono-olefins in admixture with $C_2$, $C_3$, $C_4$ and $C_5$ paraffin hydrocarbons, to a heat exchange zone and heating said feed stream with an overhead product gas from a polymerization zone as hereinafter set forth: withdrawing a resulting heated feed stream from said heating zone and introducing same into the bottom portion of a polymerization zone containing a fluidized bed of silica-alumina polymerization catalyst, said fluidized polymerization catalyst slowly moving downward countercurrent to said heated feed stream which slowly flows upward; maintaining a gaseous hydrocarbon phase containing a very small amount of said catalyst in the upper portion of said polymerization zone and above said fluidized bed; causing said $C_3$, $C_4$ and $C_5$ mono-olefins to polymerize in said polymerization zone and causing resulting polymerization products to partially condense on said silica-alumina catalyst in the upper portion of said fluidized bed; withdrawing a resulting gaseous polymerization product in admixture with unpolymerized hydrocarbons overhead from said polymerization zone; passing said overhead product gas to said heat exchange zone as hereinbefore set forth and cooling same; further cooling said overhead product gas and passing same to a liquid-vapor separation zone; withdrawing a stream of hydrocarbon vapors comprised predominantly of unreacted paraffins from said separation zone; cooling and using said hydrocarbon stream withdrawn from said separation zone as hereinafter set forth; withdrawing from said polymerization zone a portion of said silica-alumina catalyst present in the upper portion of said fluidized bed; withdrawing from said polymerization zone a portion of said silica-alumina catalyst present in the intermediate portion of said fluidized bed;

withdrawing from said polymerization zone a portion of said silica-alumina catalyst present in the lower portion of said fluidized bed; combining said catalyst withdrawn from the upper, intermediate and lower portions of said fluidized bed with said cooled hydrocarbon vapors withdrawn from said liquid-vapor separation zone as hereinbefore set forth and passing a resulting mixture back into said polymerization zone at a point just above said fluidized bed, said catalyst being returned to said fluidized bed at a temperature lower than polymerization temperature and withdrawing a liquid hydrocarbon stream from said liquid vapor separation zone containing polymerization products of said process.

5. An improved process for catalytically polymerizing hydrocarbons which comprises: passing a gaseous feed stream of hydrocarbons, containing $C_3$, $C_4$ and $C_5$ mono-olefins in admixture with $C_2$, $C_3$, $C_4$ and $C_5$ paraffin hydrocarbons, to a heat exchange zone and heating said feed stream to a temperature of from 300 to 325° F. with an overhead product gas from a polymerization zone as hereinafter set forth; withdrawing a resulting heated feed stream from said heating zone and introducing same into the bottom portion of a polymerization zone operating at a temperature of from 350 to 400° F. and at a pressure of from 550 to 670 pounds per square inch gauge and containing a fluidized bed of a 50 to 125 micron diameter silica-alumina polymerization catalyst, said fluidized polymerization catalyst slowly moving downward countercurrent to said heated feed stream which slowly flows upward at a rate of 0.3 to 1 foot per second; maintaining a gaseous hydrocarbon phase containing a small amount of said catalyst in the upper portion of said polymerization zone and above said fluidized bed; causing said $C_3$, $C_4$ and $C_5$ mono-olefins to polymerize in said polymerization zone and causing resulting polymerization products to partially condense on said silica-alumina catalyst in the upper portion of said fluidized bed; withdrawing a resulting gaseous polymerization product in admixture with unpolymerized hydrocarbons overhead from said polymerization zone; passing said overhead product gas to said heat exchange zone as hereinbefore set forth and cooling same; further cooling said overhead product gas and passing same to a liquid-vapor separation zone operating at a temperature of from 200 to 300° F. and at a pressure of from 540 to 660 pounds per square inch gauge; withdrawing a stream of hydrocarbon vapors comprised predominantly of unreacted paraffins from said separation zone; cooling and using said hydrocarbon stream withdrawn from said separation zone as hereinafter set forth; withdrawing from said polymerization zone a portion of said silica-alumina catalyst present in the upper portion of said fluidized bed in such quantity that said upper bed catalyst withdrawn amounts to from 35 to 45 per cent of the total amount of silica-alumina catalyst withdrawn from said polymerization zone; withdrawing from said polymerization zone a portion of said silica-alumina catalyst present in the intermediate portion of said fluidized bed in such quantity that said intermediate bed catalyst withdrawn amounts to from 35 to 45 per cent of the total amount of silica-alumina catalyst withdrawn from said polymerization zone; withdrawing from said polymerization zone a portion of said silica-alumina catalyst present in the lower portion of said fluidized bed in such quantity that said lower bed catalyst withdrawn amounts to from 10 to 30 per cent of the total amount of silica-alumina catalyst withdrawn from said polymerization zone; combining said catalyst withdrawn from the upper, intermediate and lower portions of said fluidized bed with said cooled hydrocarbon vapors withdrawn from said liquid-vapor separation zone as hereinbefore set forth and passing a resulting mixture back into said polymerization zone at a point just above said fluidized bed, said catalyst being returned to said fluidized bed at a temperature lower than said temperature of polymerization and withdrawing a liquid hydrocarbon stream from said liquid-vapor separation zone containing polymerization products of said process.

ERVIN C. HARNEY.

References Cited in the file of this patent

UNITED STATES PATENTS

| Number | Name | Date |
|---|---|---|
| 2,444,990 | Hemminger | July 13, 1948 |
| 2,458,165 | Holm | Jan. 4, 1949 |
| 2,459,836 | Murphree | Jan. 25, 1949 |
| 2,486,533 | Mayland et al. | Nov. 1, 1949 |

FOREIGN PATENTS

| Number | Country | Date |
|---|---|---|
| 574,892 | Great Britain | Jan. 24, 1946 |